(12) United States Patent
Kohmura

(10) Patent No.: US 6,748,766 B2
(45) Date of Patent: Jun. 15, 2004

(54) POROUS PREFORM VITRIFICATION APPARATUS

(75) Inventor: Yukio Kohmura, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 112 days.

(21) Appl. No.: 09/842,003

(22) Filed: Apr. 26, 2001

(65) Prior Publication Data
US 2002/0000102 A1 Jan. 3, 2002

Related U.S. Application Data

(63) Continuation of application No. PCT/JP00/05616, filed on Aug. 22, 2000.

(30) Foreign Application Priority Data

Aug. 26, 1999 (JP) .......................................... 11-239288

(51) Int. Cl.[7] .............................................. C03B 19/06
(52) U.S. Cl. ............................. 65/157; 65/160; 65/484
(58) Field of Search ........................ 65/144, 157, 160, 65/377, 27.12, 27.15, 413–414, 417, 420–422, 484, 507, 532

(56) References Cited

U.S. PATENT DOCUMENTS

| | | | |
|---|---|---|---|
| 4,421,540 A | * | 12/1983 | Nakahara et al. ............. 65/379 |
| 4,726,764 A | | 2/1988 | Yoshikai |
| 4,813,989 A | * | 3/1989 | Uchiyama et al. ............ 65/489 |
| 5,639,290 A | * | 6/1997 | Habasaki et al. ............. 65/377 |

FOREIGN PATENT DOCUMENTS

| | | |
|---|---|---|
| JP | 61-26531 | 2/1986 |
| JP | 61-270231 | 11/1986 |
| JP | 3-159932 | 7/1991 |
| JP | 4-21535 | 1/1992 |
| JP | 5-66092 | 3/1993 |
| JP | 6-127964 | 5/1994 |

* cited by examiner

*Primary Examiner*—Peter Chin
*Assistant Examiner*—Carlos Lopez
(74) *Attorney, Agent, or Firm*—Oblon, Spivak, McClelland, Maier & Neustadt, P.C.

(57) ABSTRACT

A porous preform vitrification apparatus of the present invention, provided with a means for forcibly feeding nitrogen etc. from a furnace core tube to a discharge gas pipe so as to balance a pressure between a furnace core tube accommodating a porous preform and a heating furnace body surrounding this and so as to suppress pressure fluctuation in the furnace core tube to a minimum level, controlling the gas feed rate and discharge rate to the furnace core tube and the heating furnace body, and controlling the feed rate of the nitrogen from the furnace core tube to the discharge gas pipe based on a differential pressure signal of a pressure in the furnace core tube and a pressure in the heating furnace body.

8 Claims, 3 Drawing Sheets

POROUS PREFORM VITRIFICATION APPARATUS

This application is a continuation of application International PCT/JP00/05616 filed on Aug. 22, 2000.

TECHNICAL FIELD

The present invention relates to a porous preform vitrification apparatus for manufacturing an optical fiber preform by dehydrating, sintering, and glassifying a porous preform.

BACKGROUND ART

In order to obtain an optical fiber preform by dehydrating, sintering, and glassifying a porous preform manufactured by a VAD (vapor-phase axial deposition) process, an OVD (outside vapor deposition) process, or the like, generally the porous preform is heat treated in a predetermined atmospheric gas obtained by mixing chlorine, oxygen, carbon monoxide, etc. into helium (hereinafter referred to as a "treatment gas").

A porous preform vitrification apparatus used for the heat treatment of this porous preform comprises, as shown in FIG. 1, a furnace core tube 2 accommodating a porous preform 1 and a heating furnace 5 surrounding an outer circumference of the furnace core tube 2. A treatment gas controlled to a predetermined feed rate by a gas feed rate controlling means (Ma) 17 is introduced by an introduction pipe 3 from a lower portion of the furnace core tube 2. The exhaust gas is discharged into the atmosphere through an exhaust suction pump 31 linked to a gas discharge pipe 4 and an exhaust gas treatment device 32. A manometer (Pa) 11 and a pressure control valve (Ba) 15 are provided in the gas discharge pipe 4.

The exhaust gas treatment device 32 is for removing harmful gas such as the chlorine in the treatment gas fed to the furnace core tube.

A high temperature near 1400° C. is required for the dehydration and sintering treatment of the porous preform, so carbon is usually used for the heating element 6 of the heating furnace 5. When the carbon is heated in the air at a high temperature, it is oxidized and consumed, therefore, in order to extend the service life of the carbon heating element, it is necessary to bring the interior of the heating furnace body to an inert gas atmosphere such as argon or nitrogen. The inert gas is introduced into the heating furnace body via a gas feed rate controlling means (Mb) 18.

Also, the furnace core tube 2 is generally made of quartz in order to maintain the purity of the porous preform, but when it is heated to a high temperature near 1400° C., it easily softens and deforms, therefore it becomes necessary to balance pressures inside and outside the furnace core tube 2 to prevent the deformation of the furnace core tube 2 during the dehydration and sintering treatment of the porous preform.

For this purpose, the pressure in the furnace core tube is detected by the manometer (Pa) 11 and the pressure in the heating furnace body is detected by a manometer Pb 12, a detection signal thereof is introduced into a differential pressure detector 13, and this differential pressure signal is used to operate both of the control means of the pressure control valve 15 used for the furnace core tube exhaust gas and the gas feed rate controlling means (Mb) 18 used for the heating furnace body to balance the pressures inside and outside the furnace core tube.

In the dehydration and sintering treatment of a porous preform, however, it was found that it was not sufficient to balance the pressures inside and outside the furnace core tube and that it was also necessary to suppress to a minimum the pressure fluctuation of the treatment gas in the furnace core tube.

This is because, in the dehydration and sintering treatment of the porous preform, according to positional relationship with a heating zone in a longitudinal direction of the porous preform in the furnace core tube and a state of progress of the dehydration and sintering, it is necessary to change the heating temperature and the feed rate of the treatment gas of the atmosphere in the furnace core tube, but when a fluctuation occurs in the pressure of the treatment gas in the furnace core tube at this time, minute unsintered portions sometimes remain in the optical fiber preform obtained by the dehydration and sintering treatment.

Accordingly, in order to obtain a high quality optical fiber preform, it becomes necessary to minimize the pressure fluctuation of the treatment gas in the furnace core tube as much as possible.

Further, when the dehydration and sintering treatment is carried out in the treatment gas up to the end, the treatment gas remains inside the optical fiber preform. Therefore, in order to prevent that, it is necessary to switch the atmospheric gas in the furnace core tube from the treatment gas to nitrogen gas near the end of the dehydration and sintering treatment. Where a plurality of vitrification apparatuses are operated in parallel, however, it is also necessary to consider a means for preventing fluctuation of the pressure of the treatment gas in the furnace core tubes of vitrification apparatuses of other systems operated in parallel.

DISCLOSURE OF THE INVENTION

An object of the present invention is to provide a technique required for the manufacture of a high quality optical fiber preform as described above and not only to balance pressures inside and outside the furnace core tube of a porous preform vitrification apparatus, but also suppress the pressure fluctuations in the furnace core tube as much as possible.

According to a first aspect of the present invention, there is provided a porous preform vitrification apparatus provided with a furnace core tube accommodating a porous preform, a heating furnace surrounding the furnace core tube and heating the furnace core tube, a means for feeding a gas essentially consisting of helium to the furnace core tube, a feed rate controlling means, a discharging means, and a discharge rate controlling means, characterized in that a gas feed branch pipe is connected to the middle of the gas discharge pipe connecting the furnace core tube and an exhaust suction pump and in that nitrogen or air is fed from the gas feeding means provided at the front end of the gas feed branch pipe.

According to a second aspect of the present invention, there is provided a porous preform vitrification apparatus of the first aspect of the invention characterized in that a drain conduit is provided in the gas feed branch pipe connected from the gas feeding means to the gas discharge pipe.

According to a third aspect of the present invention, there is provided a porous preform vitrification apparatus according to the first aspect of the invention and the second aspect of the invention characterized in that provision is made of a mechanism for detecting a pressure difference between a pressure in a furnace core tube and a pressure in a heating furnace body and comprehensively controlling a feed rate of the gas to the furnace core tube, a discharge rate of an exhaust from the furnace core tube, a feed rate of an inert gas into the heating furnace body, a discharge rate of the gas from the interior of the heating furnace body, a feed rate of a gas such as nitrogen fed to the gas feed branch pipe, and further a gas discharge rate of the exhaust suction pump based on a differential pressure signal with the pressure in the furnace core tube as a reference.

According to a fourth aspect of the present invention, there is provided a porous preform vitrification apparatus of the first aspect of the invention to the third aspect of the invention characterized in that the feed rate of the nitrogen or air fed from a nitrogen or other gas feed branch pipe is controlled to 15 to 50% of the rate of the treatment gas essentially consisting of helium fed to the furnace core tube.

According to a fifth aspect of the present invention, there is provided a group of porous preform vitrification apparatuses comprised of a plurality of porous preform vitrification apparatuses according to the first aspect of the invention to the fourth aspect of the invention arranged in parallel, characterized in that an exhaust suction pump is provided for every porous preform vitrification apparatus and in that a common exhaust gas treatment device is provided on the discharge side of the exhaust suction pumps.

By employing the porous preform vitrification apparatuses according to the present invention, stable manufacture of a high quality optical fiber preform becomes possible.

BEST MODE FOR CARRYING OUT THE INVENTION

Below, the present invention will be explained by referring to the attached drawings.

Figure 1:
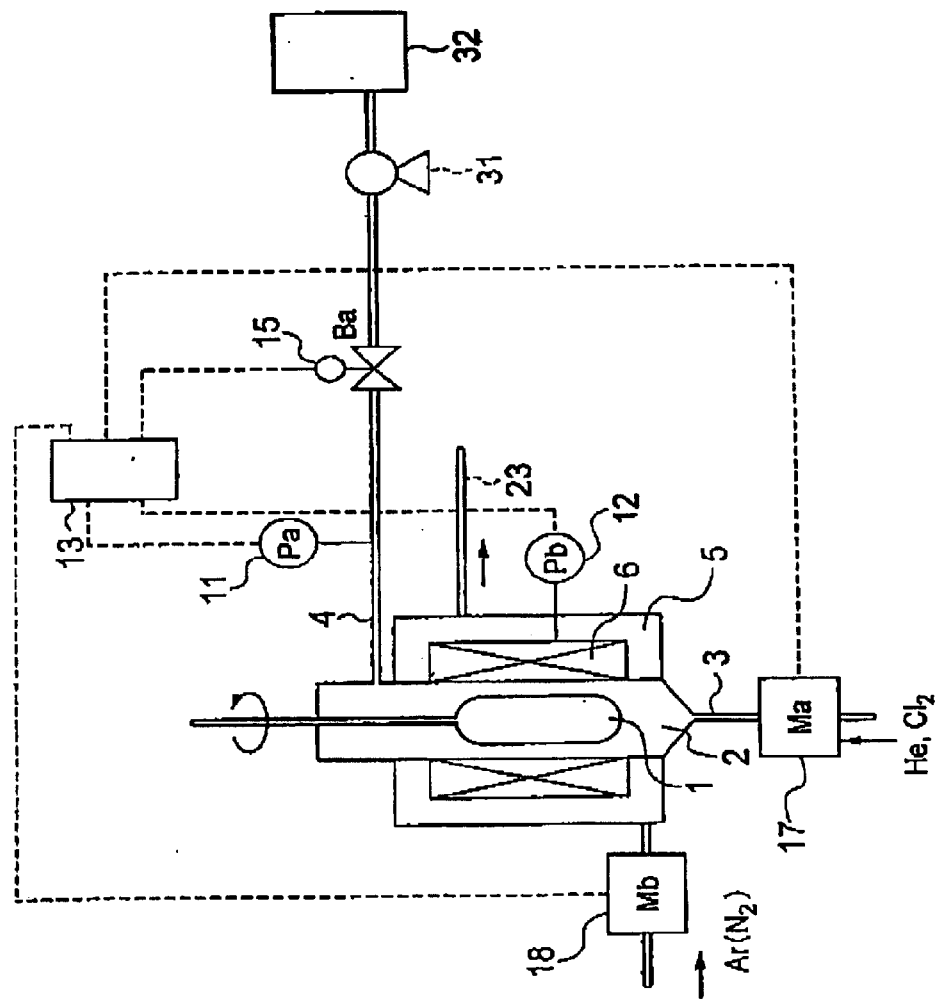
FIG. 1 is a view of the configuration of a porous preform vitrification apparatus of the prior art.
Figure 2:
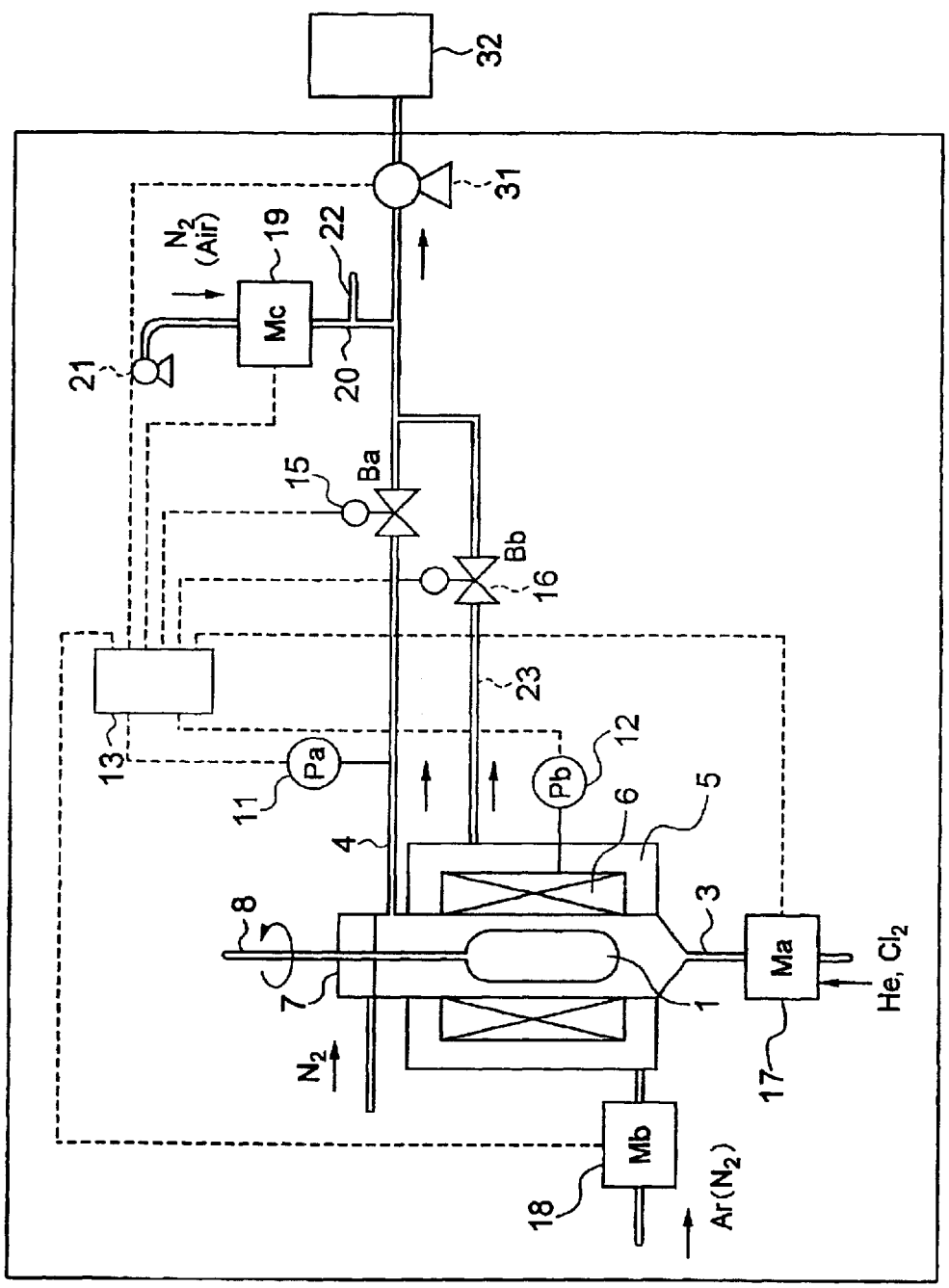
FIG. 2 is a view of the configuration of a porous preform vitrification apparatus showing an embodiment of the present invention.

FIG. 2 is a schematic view of the configuration of a porous preform vitrification apparatus according to an embodiment of the present invention. Note that, as the reference numerals used in FIG. 2, the same reference numerals were used for corresponding portions of the view of the configuration of FIG. 1 of the porous preform vitrification apparatus of the prior art.

The porous preform vitrification apparatus shown in FIG. 2 comprises a furnace core tube 2 accommodating a porous preform 1 and a heating furnace 5 surrounding the outer circumference of the furnace core tube 2. Treatment gas controlled to a predetermined feed rate by the gas feed rate controlling means (Ma) 17 is introduced by the introduction pipe 3 from a lower portion of the furnace core tube 2. In the heating furnace 5, in order to prevent the oxidation and consumption of the carbon heating element, inert gas controlled to a predetermined feed rate by the gas feed rate controlling means (Mb) 18 is introduced into the heating furnace body 6. The above configuration is the same as that of the apparatus shown in FIG. 1.

The first characteristic feature of the present invention resides in the point of suppressing the pressure fluctuation of the gas inside the furnace core tube 2 to a minimum level.

Namely, the discharge pipe 4 for discharging the treatment gas from an upper portion of the furnace core tube 2 is provided with a manometer (Pa) 11 and a pressure control valve (Ba) 15 in that order from the furnace core tube side, a discharge pipe 23 of the inert gas discharged from the heating furnace body is connected after the pressure control valve (Ba) 15, and further a gas feed branch pipe 20 is connected, then is coupled to the exhaust suction pump 31 and the exhaust gas treatment device 32.

The manometer (Pa) 11 is for detecting the pressure in the furnace core tube 2. The pressure control valve (Ba) 15 is a means for controlling the pressure in the furnace core tube. The manometer (Pa) 11 can be directly connected to the furnace core tube 2 too without being connected to the gas discharge pipe 4.

The gas feed branch pipe 20 is used as a means of pressure control in the furnace core tube for feeding nitrogen or air from a force blower 21 via a gas feed rate controlling means (Mc) 19 into the discharge pipe 4 of the treatment gas. The effect thereof will be explained later.

The manometer (Pb) is connected to the heating furnace body and detects the pressure in the heating furnace body. At the same time, a pressure control valve (Bb) 16 is provided in the middle of the inert gas discharge pipe 23 from the heating furnace body and used as the means of pressure control in the heating furnace body.

Note that, in FIG. 2, the inert gas discharge pipe 23 from the heating furnace body is connected to the treatment gas discharge pipe 4 from the furnace core tube, and the inert gas is discharged by the common exhaust suction pump, but it is also possible to employ a means of discharging the same by a small sized exhaust suction pump of another system.

The pressure signals detected from the manometer (Pa) 11 and the manometer (Pb) 12 are guided to the differential pressure detector 13. The pressure control valves (Ba) 15 and (Bb) 16, the gas feed rate controlling means (Ma) 17, (Mb) 18, and (Mc) 19, and further the speed of the exhaust pump 31 are controlled by the differential signal output from this, whereby the pressure fluctuation of the treatment gas in the furnace core tube is suppressed to the minimum level and, at the same time, the pressure in the furnace core tube and the pressure in the heating furnace body surrounding the furnace core tube are balanced.

Note that, it is necessary to change the feed rate of the treatment gas in the furnace core tube in the process of the dehydration and sintering treatment, but this is carried out by the control of the gas feed rate controlling means (Ma) 17 according to another operation program.

Here, an explanation will be made of the effect of the nitrogen or air fed from the gas feed branch pipe 20 to the treatment gas discharge pipe 4.

The furnace core tube atmospheric gas (treatment gas) is a gas mixture obtained by mixing chlorine, oxygen, carbon monoxide, etc. in helium, but since the molecular weight of the main ingredient helium is small, the specific gravity of the gas mixture as a whole is small, therefore the exhaust suction pump 31 cannot exhibit a predetermined exhaust capacity. For this reason, in order to suppress the pressure fluctuation occurring in the furnace core tube with a high response when the treatment gas feed rate in the furnace core tube is changed, the action of the pressure control valve (Ba) 16 alone is insufficient.

In this case, when the nitrogen or air is fed from the gas feed branch pipe 20 according to the present invention to the treatment gas discharge pipe 4 linked to the furnace core tube, the nitrogen or air having a large molecular weight mixed with the treatment gas having a small molecular weight, therefore the molecular weight of the exhaust gas as a whole becomes large, so the exhaust suction pump 31 becomes able to exhibit the predetermined exhaust capacity. Therefore, if the pressure control valves, gas feed rate controlling means, and the exhaust pump speed are comprehensively operated according to the signal from the differential pressure detector 13, the pressure fluctuation of the treatment gas in the furnace core tube can be suppressed to the minimum level with a high pressure.

The amount of the pressure fluctuation of the treatment gas in the furnace core tube at the time of operation of the porous preform vitrification apparatus employing the present configuration becomes about 15 Pa, so the pressure fluctuation could be remarkably reduced in comparison with the 50 Pa according to the apparatus of FIG. 1 (the pressure of the atmospheric gas in the furnace core tube is about 100,000 Pa).

The action of the gas feed branch pipe 20 is as described above, but if a drain conduit 22 with the front end opened to the atmospheric air is connected to the gas feed branch pipe 20, the effect thereof is further raised.

Namely, the pressure of the treatment gas in the furnace core tube is set slightly higher than the atmospheric pressure, therefore, as one of the systems for suppressing the pressure fluctuation of the treatment gas in the furnace core tube, the gas feed rate controlling means (Mc) 19 is operated. When the feed rate of the gas such as the nitrogen to be fed to the gas feed branch pipe 20 changes, even when excessive gas is fed, the excess will be released into the atmospheric air, so the amount of pressure fluctuation of the treatment gas in the furnace core tube becomes further smaller than that at the time when the drain conduit 22 is not provided. Namely, the action of releasing only the amount of pressure fluctuation of the treatment gas in the furnace core tube from the drain conduit 22 is imparted.

The gas released into the atmosphere is nitrogen or air, so no harmful gas will be released.

Note that, in the upper portion of the furnace core tube 2 of the porous preform vitrification apparatus used in the present embodiment, as shown in FIG. 2, a sealing box 7 is provided for feeding inert gas in order to prevent the treatment gas containing harmful gas such as chlorine gas mixed therein from leaking from a clearance between a support shaft 8 of the porous preform and the upper portion of the furnace core tube into the atmosphere.

Figure 3:
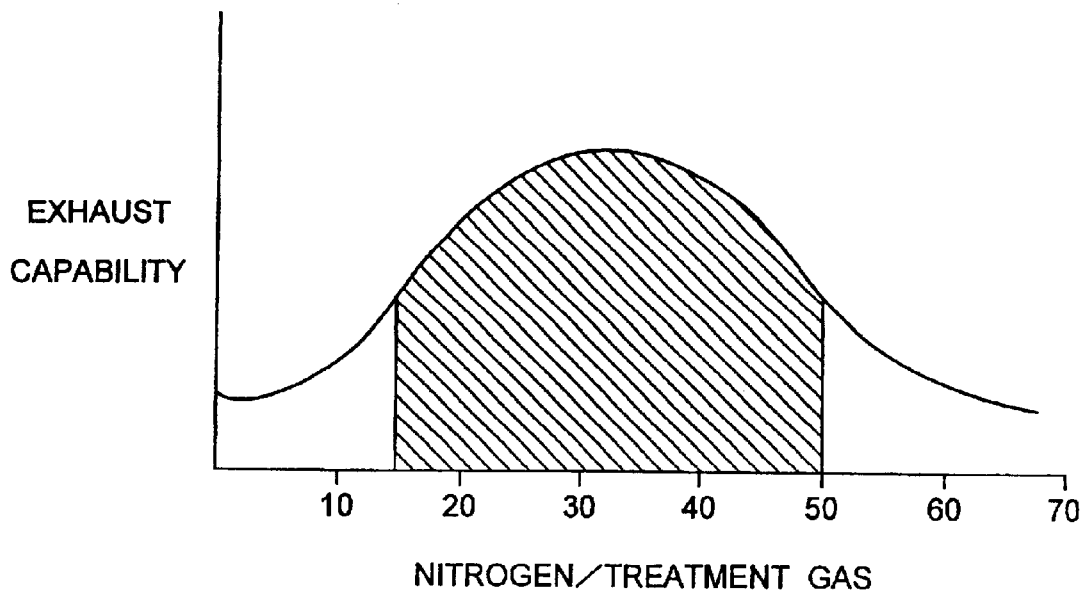
FIG. 3 is a view of the relationship between an exhaust capacity of an exhaust suction pump and a composition of exhaust gas.

FIG. 3 shows the relationship between the exhaust capacity of the exhaust suction pump 31 (exhaust capacity of the treatment gas in the furnace core tube) and the gas composition (ratio of the amount of nitrogen to the amount of treatment gas). The exhaust capacity rises along with an increase of the percentage of the nitrogen, but when it exceeds about 30%, tends to fall. This is because, since the amount of the treatment gas fed into the furnace core tube is substantially constant, the higher the percentage of the nitrogen fed from the gas feed branch pipe 20 to the treatment gas discharge pipe 4, the larger by that amount the entire gas to be discharged and the larger the amount of the load of the exhaust suction pump.

From the results shown in FIG. 3, if the percentage of the nitrogen fed from the gas feed branch pipe 20 to the treatment gas discharge pipe 4 is 15 to 50%, the exhaust suction pump 31 sufficiently exhibits the exhaust capacity, and the pressure fluctuation of the treatment gas in the furnace core tube is suppressed to the minimum level.

As the exhaust suction pump 31, a constant capacity pump is suitable. If there is no large change in the feed rate of the treatment gas into the furnace core tube, for example during standard dehydration and sintering treatment, the predetermined object can be achieved even if the exhaust suction pump is operated at a standard speed, but when the atmospheric gas is switched from the treatment gas to nitrogen gas for example at the end of the dehydration and sintering treatment, the fluctuation of the gas composition is remarkable, so it is also possible to control the speed according to another program.

Figure 4:
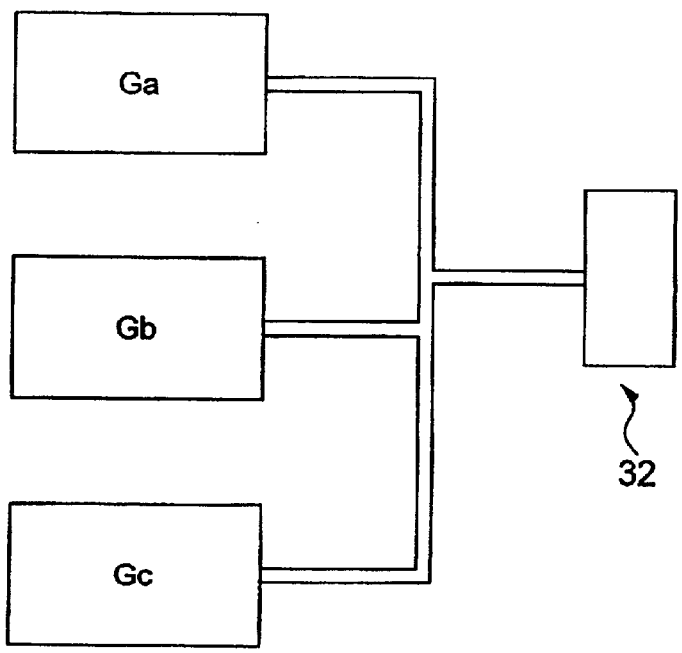
FIG. 4 is a view of the configuration of a group of porous preform vitrification apparatuses showing another embodiment of the present invention.

FIG. 4 is a view of the configuration of a group of porous preform vitrification apparatuses showing another embodiment.

In the embodiment shown in FIG. 2, while for just one porous preform vitrification apparatus, it is necessary to arranges the present apparatuses and operating them in parallel in order to raise the production efficiency. In this case, the exhaust gas treatment device is used in common. The configurations of the apparatuses up to the exhaust suction pumps consist of those of FIG. 2 arranged as is in parallel. If necessary, a common induction pump is sometimes additionally provided in front of the exhaust gas treatment device 32.

When giving such a configuration to a plurality of porous preform vitrification apparatuses, since the systems are operated by independent control systems, in each system, not only is it possible to suppress the pressure fluctuation of the treatment gas in the furnace core tube during the dehydration and sintering treatment to a minimum level, but it is also possible to prevent the processing work of one system from adversely influencing the operation state of another system even at the time of switching of the gas when the dehydration and sintering treatment ends or when the treatment material is taken out of the furnace core tube 2 after the end of the treatment.

Accordingly, the operations of all systems are stabilized, so a high quality optical fiber preform can be manufactured with a high yield and further trouble directly leading to accidents in the hardware such as pressure damage to the furnace core tube can be avoided.

As described above, by using the porous preform vitrification apparatus or apparatus group according to the present invention, not only can a high quality optical fiber preform be manufactured with a high yield, but also occurrence of hardware accidents such as the pressure damage to the furnace core tube can be prevented and the maintenance and management of the apparatus become easy. Further, as an additional effect, the expensive treatment gas essentially consisting of helium can be conserved. Namely, in the apparatus of FIG. 1, a feed rate of 100 SLM (SLM: standard liter per minute at 0° C., 1 atm) was required for the helium and 2 to 4 SLM for the chlorine, but it was seen that by the usage of the porous preform vitrification apparatus according to the present invention, the additional effect was obtained that the rate of helium could be reduced to 20 to 30 SLM and the rate of chlorine could be reduced to 0.7 to 1.2 SLM.

Industrial Applicability

A porous preform vitrification apparatus of the present invention is used for glassifying the porous preform 1 used for the manufacture of the optical fiber.

What is claimed is:

1. A porous preform vitrification apparatus comprising:
   a furnace core tube accommodating a porous preform;
   a heating furnace surrounding the furnace core tube and heating the furnace core tube;

a first gas feeding means for feeding a first gas essentially consisting of helium to the furnace core tube;

a first gas feed rate controlling means for controlling a feed rate of the first gas;

a first gas discharging means including a gas discharge pipe connected to the furnace core tube and an exhaust suction pump connected to the gas discharge pipe;

a first gas discharge rate controlling means for controlling a discharge rate of the gas discharged by the first gas discharging means;

a gas feed branch pipe connected to the gas discharge pipe between the first gas discharge rate controlling means and the exhaust suction pump;

a second gas feeding means connected to the gas feed branch pipe for feeding a second gas, which comprises nitrogen or air, to the gas discharge pipe; and a drain conduit connected to the gas feed branch pipe connected to the second gas feeding means.

2. A porous preform vitrification apparatus comprising:

a furnace core tube accommodating a porous preform;

a heating furnace surrounding the furnace core tube and heating the furnace core tube;

a first gas feeding means for feeding a first gas essentially consisting of helium to the furnace core tube;

a first gas feed rate controlling means for controlling a feed rate of the first gas;

a first gas discharging means including a gas discharge pipe connected to the furnace core tube and an exhaust suction pump connected to the gas discharge pipe;

a first gas discharge rate controlling means for controlling a discharge rate of the gas discharged by the first gas discharging means;

a gas feed branch pipe connected to the gas discharge pipe between the first gas discharge rate controlling means and the exhaust suction pump;

a second ass feeding means connected to the gas feed branch pipe for feeding a second gas, which comprises nitrogen or air, to the gas discharge pipe; and a mechanism for detecting a pressure difference between a pressure in the furnace core tube and a pressure in a heating furnace body provided at an outer circumference of the furnace core tube, and for comprehensively controlling:

a feed rate of the first gas to the furnace core tube, a discharge rate of an exhaust gas from the furnace core tube, a feed rate of an inert gas into the heating furnace body, a discharge rate of the gas from the interior of the heating furnace body, a feed rate of the second gas fed to the gas feed branch pipe, and a gas discharge rate of the discharge gas at the exhaust suction pump based an the detected differential pressure signal with the pressure in the furnace core tube as a reference.

3. A porous preform vitrification apparatus as set forth in claim 2, wherein the feed rate of the second gas fed from the gas feed branch pipe is controlled to 15 to 50% of the rate of the treatment gas essentially consisting of helium fed to the furnace core tube.

4. A group of porous preform vitrification apparatuses comprised of a plurality of porous preform vitrification apparatuses as set forth in claim 1 arranged in parallel, wherein:

the exhaust suction pump is provided for every porous preform vitrification apparatus, and a common exhaust gas treatment device is provided on the discharge side of the exhaust suction pumps.

5. A porous preform vitrification apparatus comprising:

a furnace core tube accommodating a porous preform, a heating furnace surrounding the furnace core tube and heating the furnace core tube, a first means for feeding a gas essentially consisting of helium to the furnace core tube, a feed rate controlling means, a discharging means, and a discharge rate controlling means, wherein a gas feed branch pipe is connected to a section of a gas discharge pipe connecting the furnace core tube and an exhaust suction pump and in that nitrogen or air is fed from a second gas feeding means provided at the front end of the gas feed branch pipe, and wherein a drain conduit is connected to the gas feed branch pipe connected to the second gas feeding means.

6. A porous preform vitrification apparatus as set forth in claim 5, further comprising a mechanism for detecting a pressure difference between a pressure in a furnace core tube and a pressure in a heating furnace body, and comprehensively controlling:

a feed rate of the gas to the furnace core tube, a discharge rate of an exhaust from the furnace care tube, a feed rate of an inert gas into the heating furnace body, a discharge rate of the gas from the interior of the beating furnace body, a feed rate of a gas such as nitrogen fed to the gas feed branch pipe, and a gas discharge rate of the exhaust suction pump based on a differential pressure signal with the pressure in the furnace core tube as a reference.

7. A porous preform vitrification apparatus as set forth in claim 6, wherein the feed rate of the nitrogen or air fed from a nitrogen or other gas feed branch pipe is controlled to 15 to 50% of the rate of the treatment gas essentially consisting of helium fed to the furnace core tube.

8. A group of porous preform vitrification apparatuses comprised of a plurality of porous preform vitrification apparatuses as set forth in claim 5 arranged in parallel, wherein:

an exhaust suction pump is provided for every porous preform vitrification apparatus, and a common exhaust gas treatment device is provided on the discharge side of the exhaust suction pumps.

* * * * *